(12) United States Patent
Nelson

(10) Patent No.: US 7,692,414 B2
(45) Date of Patent: Apr. 6, 2010

(54) REGENERATIVE STATIC EXCITATION SYSTEM FOR SUPERCONDUCTING ROTOR

(75) Inventor: Robert J. Nelson, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 395 days.

(21) Appl. No.: 11/818,325

(22) Filed: Jun. 14, 2007

(65) Prior Publication Data

US 2008/0309296 A1 Dec. 18, 2008

(51) Int. Cl.
  *H02P 9/10* (2006.01)
  *H02J 1/00* (2006.01)
  *H02J 3/00* (2006.01)
  *H02P 1/54* (2006.01)
  *H02P 5/00* (2006.01)
  *H02P 5/46* (2006.01)

(52) U.S. Cl. .............................. 322/59; 322/8; 322/45; 318/108

(58) Field of Classification Search .............. 322/8, 322/45, 59; 318/108
See application file for complete search history.

(56) References Cited

U.S. PATENT DOCUMENTS

| | | | | |
|---|---|---|---|---|
| 4,200,831 A | * | 4/1980 | Weldon et al. | 322/8 |
| 4,383,215 A | * | 5/1983 | Frister | 322/63 |
| 4,633,160 A | * | 12/1986 | Graham | 322/20 |
| 4,841,217 A | * | 6/1989 | Weldon et al. | 322/8 |
| 4,977,345 A | | 12/1990 | Toperzer | 310/242 |
| 5,210,452 A | * | 5/1993 | Pratap et al. | 310/12 |
| 5,844,342 A | * | 12/1998 | Miyatani et al. | 310/114 |
| 6,285,089 B1 | | 9/2001 | Nelson | 290/52 |
| 6,356,472 B1 | | 3/2002 | Runkle | 363/170 |
| 7,102,304 B2 | * | 9/2006 | Sebille et al. | 318/108 |
| 7,116,082 B1 | * | 10/2006 | Baumgart | 322/45 |
| 2006/0066270 A1 | * | 3/2006 | Kumagai et al. | 318/139 |
| 2006/0108954 A1 | * | 5/2006 | Sebille et al. | 318/108 |
| 2008/0309296 A1 | * | 12/2008 | Nelson | 322/4 |

\* cited by examiner

*Primary Examiner*—Nicholas Ponomarenko
*Assistant Examiner*—Pedro J Cuevas

(57) ABSTRACT

The present invention provides for a static excitation system for a superconducting rotor that comprises multiple brushes (12) in contact with the superconducting rotor winding (6), normally via collector rings and field leads. A power conditioning device (16) is connected to the brushes (12), and an energy storage device (18) is linked to the power conditioning device (16). The power conditioning device provides power from the energy storage device to the superconducting rotor when required, and when power to the superconducting rotor is not required, the power conditioning device takes excess power from the superconducting rotor and stores it in the energy storage device.

18 Claims, 3 Drawing Sheets

REGENERATIVE STATIC EXCITATION SYSTEM FOR SUPERCONDUCTING ROTOR

FIELD OF THE INVENTION

The field of the invention relates to superconducting rotors, and more specifically to excitation systems.

BACKGROUND

In certain high speed rotating equipment with static excitation, such as large turbine-generator systems, carbon brush current collection systems are utilized in conducting a field current to the generator rotor. The collector sets typically comprise a pair of collector rings, or one for each pole, mounted on the rotor and a set of stationary brushes angularly displaced around, and in contact with, each collector ring. In order to protect the collector sets and to prevent inadvertent contact with them by personnel, they are usually housed within an enclosure which includes a fixed base. This enclosure is commonly referred to as a collector house. Typically the collector house includes stationary traverse end walls having sealed openings through which the rotor shaft passes and a house defining the roof and sidewalls of the enclosure.

Because of high energy demands, it is common to arrange several carbon brushes within a magazine or gang type brush holder. Several brushes, normally six, are grouped within the brush holder, a plurality of which are arranged around the outside diameter of the generator rotor. Examples of such brush holders are described in U.S. Pat. No. 3,387,155, issued on Jun. 4, 1968, and U.S. Pat. No. 3,710,478 which issued on Jan. 16, 1973.

In synchronous generator excitation systems the field windings require a continuous source of power, and the excitation system must be sized to draw the maximum energy and power from either the local system for a static excitation system, or from the shaft for a brushless system. FIG. 1 illustrates an example of a static excitation system. The generator rotor 2, disposed in the AC windings 4, has a protruding shaft 6. The static excitation system 8, which comprises an excitation transformer followed by a large power rectifier and associated controls, draws power from the local grid 10 which provides power to the shaft 6, though carbon brushes 12 and slip rings 14.

These types of excitations systems, however, are complicated and expensive, since they draw power from the grid and require the installment of electrical components. In the prior art, even if the excitation system drew power directly from the generator, since the generator is still part of the local grid, the input voltage to the excitation transformer would still drop too low to use.

What is needed is an excitation system that does not rely on an external power supply, and is simple to install and use. Other difficulties with the prior art also exist, some of which will be apparent upon further reading.

SUMMARY OF THE INVENTION

With the foregoing in mind, methods and apparatuses consistent with the present invention, which inter alia facilitates the static excitation of a superconducting rotor.

The present invention provides for a regenerative static excitation system for superconducting rotors. With the present invention, the excitation system is separate from the grid, and draws power from the superconducting rotor itself, thereby being regenerative. Since the rotors are essentially superconducting, power is not significantly dissipated from the rotor; therefore, the regenerative static excitation system requires only minimal recharging from an outside source. Without the need to draw power directly from the local grid, the input voltage to the excitation transformer would not ever drop too low to use.

These and other objects, features, and advantages in accordance with the present invention are provided particular embodiments by a static excitation system for a superconducting rotor that comprises multiple brushes in contact with the superconducting rotor. A power conditioning device is connected to the brushes, and an energy storage device is linked to the power conditioning device. The power conditioning device provides power from the energy storage device to the superconducting rotor when required, and when power to the superconducting rotor is not required, the power conditioning device takes excess power from the superconducting rotor and stores it in the energy storage device.

In particular embodiments the superconducting rotor is part of a utility or industrial synchronous generator of at least 25 MVA. The energy storage device is one or more of a flywheel, capacitor and a bank of batteries, and may further comprise a trickle charger.

In other particular embodiments the power conditioning device and the energy storage device are a single unit. Multiple energy storage devices can also be used, just as multiple power conditioning devices can be used.

In preferred embodiments the static excitation system is independent from an external power grid. The energy storage device should hold at least 10% more energy than the amount required for excitation of the rotor, which in may cases is over 2 MJ.

In another embodiment the present invention provides for a static excitation system for a superconducting rotor that comprises a brushless exciter system. A power conditioning device, and an energy storage device, where the energy storage device is linked to the power conditioning device, and the power conditioning device is connected to the brushless exciter system. The power conditioning device provides power from the energy storage device to the superconducting rotor when required, and when power to the superconducting rotor is not required, the power conditioning device takes excess power from the superconducting rotor and stores it in the energy storage device. The static excitation system is also independent from an external power grid. In particular embodiments the energy storage device holds over 1 kJ.

In still another embodiment the present invention provides for a method for supplying a superconducting rotor with static excitation that comprises obtaining a generator disposed within windings, the generator also having a shaft and a set of slip rings on the shaft. Then placing brushes in contact with the set of slip rings and connecting the brushes to a power conditioning device. The power conditioning device is also linked to an energy storage device. The power conditioning device provides power from the energy storage device to the superconducting rotor when required, and when power to the superconducting rotor is not required, the power conditioning device takes excess power from the superconducting rotor and stores it in the energy storage device. In particular embodiments a trickle charger occasionally supplements power to the energy storage device, or the power conditioning device can be independent from an external power grid.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

The present invention provides for a regenerative static excitation system for superconducting rotors that stores the energy required by a superconducting rotor field winding until it is required. Unlike the prior art, the present invention is reliable since it is independent from the outside grid, or in some situations uses only occasional power from the grid in the form of a trickle charger.

With the present invention, the excitation system is separate from the grid, and draws power from the superconducting rotor itself, thereby being regenerative. Since the rotors are essentially superconducting, power is not significantly dissipated from the rotor, therefore the regenerative static excitation system requires only minimal recharging from an outside source. With the present invention, the need for an excitation transformer and rectifier, which are expensive components of the excitation systems of the prior art, are eliminated. Therefore the excitation system does not need to be sized to draw the maximum energy and power from the local system. Also, if the local power grid is ever non-functional the present invention is not affected and is therefore more reliable.

The regenerative static excitation system requires power. This power is obtained from excess field power from the rotor which is collected by a power conditioning device and into a storage device. The storage device can be varied, such as a flywheel, capacitor or a bank of batteries. The minimum requirements for the storage device should be a capacity slightly higher than the power needed for the excitation system. For example, a generator that requires 5 MJ for excitation should have 5.5 MJ or greater storage capacity in the storage device. Occasionally, such as when the power drops below a required threshold or during maintenance, the power in the storage device will need to be supplemented. This can be done by an external charger, such as a trickle charger hooked into the grid, or by the addition to/replacement of the storage device; for example, adding an additional battery to the bank or replacing the bank of batteries. Other known options may also be appropriate.

The power conditioning device is responsible for transferring power back and forth between the energy storage system and the field winding by controlling the current flow. The exact design of the conditioning device will depend on the nature of the storage device, but will essentially comprise a dc to dc converter (sometimes called a "chopper"), types of which will be readily apparent to one of ordinary skill in the art. In addition, the power conditioning device will, if desired, monitor the field power in the windings and determine whether power should be drawn from, or supplied to, the windings. In some embodiments the conditioning device can regulate the trickle charge to the storage device.

Figure 1:
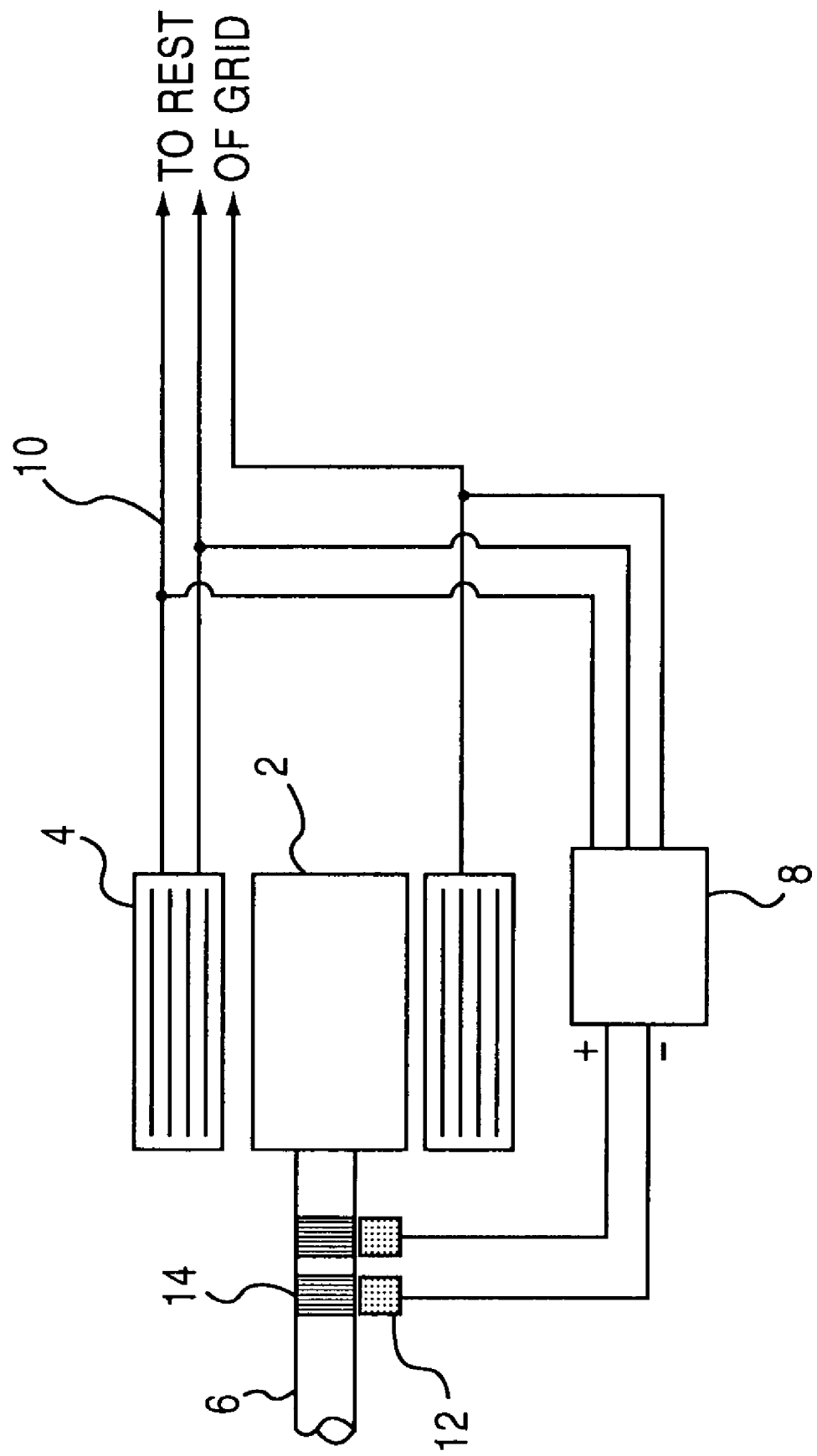
FIG. 1 illustrates a static excitation system according to the prior art.
Figure 2:
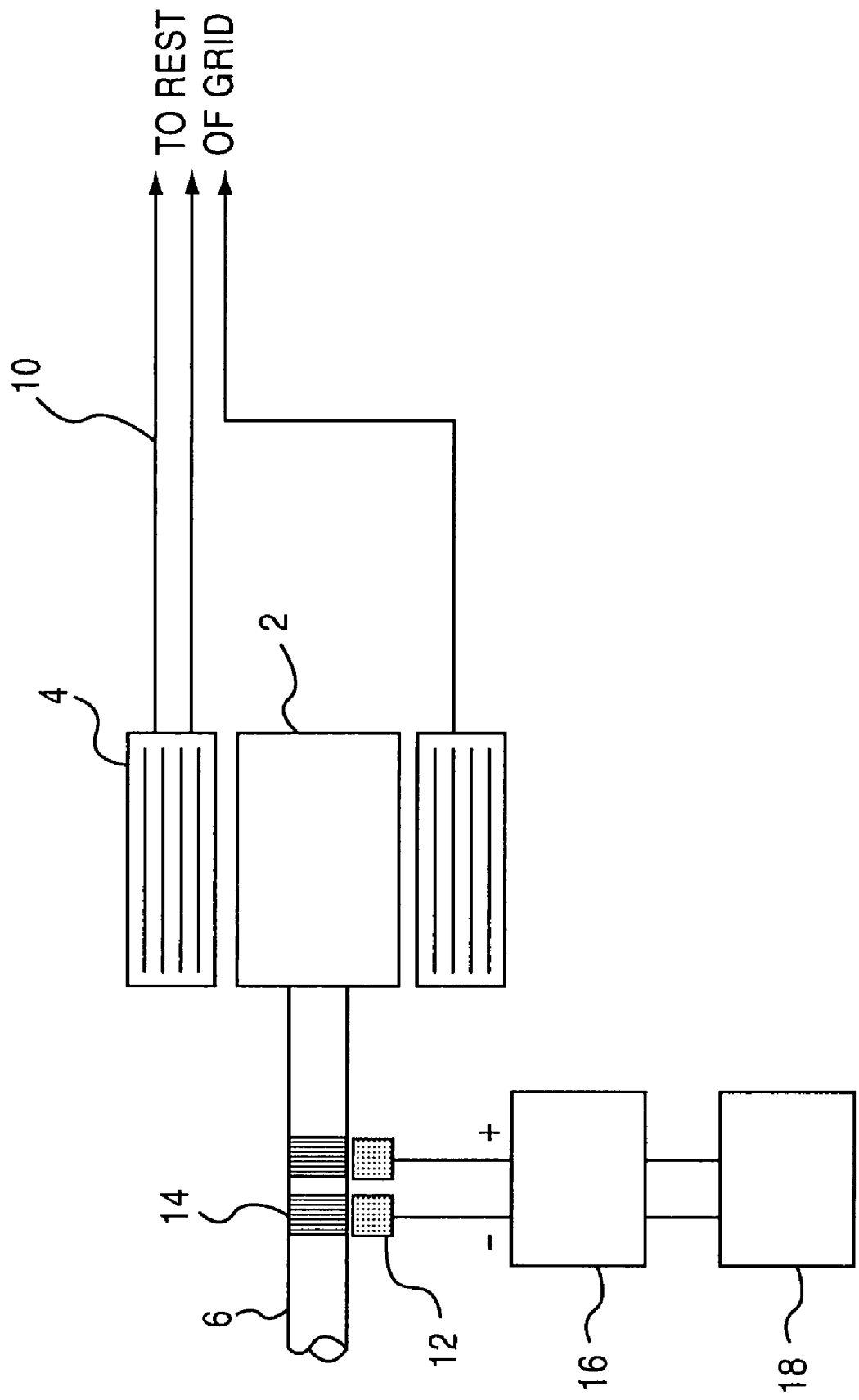
FIG. 2 illustrates a regenerative power excitation system according to one embodiment of the present invention.

FIG. 2 illustrates one embodiment of the present invention. A generator 2 is disposed within windings 4. The protruding generator shaft 6 contains leads that extend to the field windings in the rotor and has a set of slip rings 14 that transfer current to and from the energy storage device to the filed windings via the rotor leads and brushes 12. As the generator rotor system produces excess power, this is collected by a power conditioning device 16, and transferred into an energy storage device 18.

One of the reasons that a regenerative static excitation system work on superconducting rotors is because the field energy requirements for a superconducting rotor are small. The energy stored, $½ LI^2$, where L is the inductance of the field winding, and I the dc field current, is approximately 2-6 mega joules in the sizes being considered for near term application. As those familiar with rotor design appreciate, the inductance is a function of the square of the number of turns in the rotor winding, so the value of L and I will vary with the rotor capability and winding design. For a superconducting rotor, the winding resistance, R approaches zero, so there is minimal dissipation of the field power, once the current is injected into the rotor windings. Consequently, the current will stay nearly constant with no replenishment from outside. The winding inductance can be charged or discharged by regulating the voltage. $Vf=L\ dI/dt$, where Vf is the field voltage (normally zero, except when the superconducting field winding is being charged or discharged), so I is the integral of Vf/L. When Vf is zero in the normal operating condition, the field current remains constant. When Vf is positive, the current increases with Vf/L as a function of time. When Vf is negative the current decreases with Vf/L as a function of time.

Figure 3:
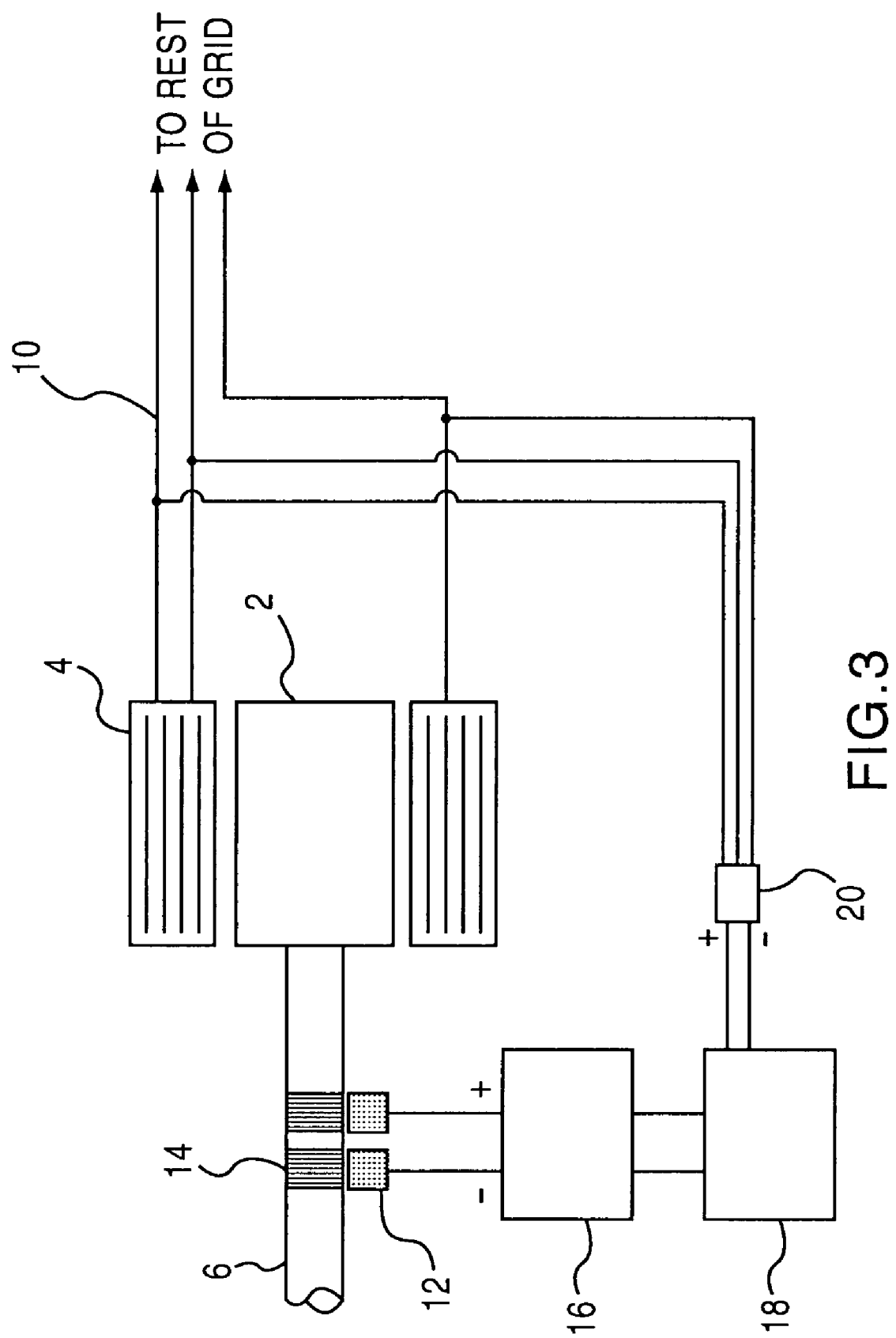
FIG. 3 illustrates a regenerative power excitation system with a trickle charger according to one embodiment of the present invention.

FIG. 3 shows a similar embodiment but with a trickle charger 20 connected to the grid 10 and the energy storage device 18, or even the power conditioning device 16. As noted above, other embodiments, such as replacing the batteries, and other techniques known in the art may also be used to maintain the energy storage device.

In addition to the carbon brush system illustrated, a brushless excitation systems may also be used. A brushless excitation system requires significantly less energy, in the order of a few kilo-joules for excitation of the generator field, but is more complicated. A brushless exciter has a rotating rectifier arrangement that supplies power to the generator field winding. DC power is supplied to a stationary field winding, which excites an alternating voltage in a rotating armature. The armature provides AC to the rotating rectifier, which then powers the field. The present invention may be used equally with a brushless system, with appropriate modifications familiar to those knowledgeable in the art.

As illustrated herein, the power conditioning device and energy storage device have appeared as two separate, connected devices. In many cases, however, these two devices can essentially be packaged as a single device, and such an arrangement does not vary from the present invention.

In one embodiment the present invention provides for a static excitation system for a superconducting rotor 6 that comprises multiple brushes 12 in contact with the superconducting rotor. A power conditioning device 16 is connected to the brushes 12, and an energy storage device 18 is linked to the power conditioning device 16. The power conditioning device provides power from the energy storage device to the superconducting rotor when required, and when power to the superconducting rotor 6 is not required, the power conditioning device takes excess power from the superconducting rotor and stores it in the energy storage device 18.

In particular embodiments the superconducting rotor is part of a utility or industrial synchronous generator of at least 25 MVA. The energy storage device is one or more of a flywheel, capacitor and a bank of batteries, and may further comprise a trickle charger.

In other particular embodiments the power conditioning device and the energy storage device are a single unit. Multiple energy storage devices can also be used, just as multiple power conditioning devices can be used.

In preferred embodiments the static excitation system is independent from an external power grid. The energy storage device should hold at least 10% more energy than the amount required for excitation of the rotor, which in may cases is over 2 MJ.

In another embodiment the present invention provides for a static excitation system for a superconducting rotor 6 that comprises a brushless exciter system. A power conditioning device, and an energy storage device, where the energy storage device is linked to the power conditioning device, and the power conditioning device is connected to the brushless exciter system. The power conditioning device provides power from the energy storage device 18 to the superconducting rotor 6 when required, and when power to the superconducting rotor 6 is not required, the power conditioning device 16 takes excess power from the superconducting rotor 6 and stores it in the energy storage device 18. The static excitation system is also independent from an external power grid 10. In particular embodiments the energy storage device holds over 1 kJ.

In still another embodiment the present invention provides for a method for supplying a superconducting rotor 6 with static excitation that comprises obtaining a generator 2 disposed within windings 4, the generator also having a shaft 6 and a set of slip rings 14 on the shaft. Then placing brushes 12 in contact with the set of slip rings and connecting the brushes to a power conditioning device 16. The power conditioning device 16 is also linked to an energy storage device 18. The power conditioning device 16 provides power from the energy storage device 18 to the superconducting rotor 6 when required, and when power to the superconducting rotor is not required, the power conditioning device takes excess power from the superconducting rotor and stores it in the energy storage device. In particular embodiments a trickle charger occasionally supplements power to the energy storage device 18, or the power conditioning device can be independent from an external power grid 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A static excitation system for a superconducting rotor comprising:
   a plurality of brushes in contact with said superconducting rotor;
   a power conditioning device; and
   an energy storage device;
   wherein said energy storage device is linked to said power conditioning device, and wherein said power conditioning device is connected to said plurality of brushes;
   wherein said power conditioning device provides power from said energy storage device to said superconducting rotor when required, and when power to said superconducting rotor is not required, said power conditioning device takes excess power from said superconducting rotor and stores it in said energy storage device.

2. The static excitation system of claim 1, wherein said superconducting rotor is part of a utility-industrial synchronous generator of at least 25 MVA.

3. The static excitation system of claim 1, wherein said energy storage device is at least one of a flywheel, capacitor and a bank of batteries.

4. The static excitation system of claim 1, further comprising a trickle charger.

5. The static excitation system of claim 1, wherein said power conditioning device and said energy storage device are a single unit.

6. The static excitation system of claim 1, wherein a plurality of energy storage devices are used.

7. The static excitation system of claim 1, wherein a plurality of power conditioning devices are used.

8. The static excitation system of claim 1, wherein said static excitation system is independent from an external power grid.

9. The static excitation system of claim 1, wherein the energy storage device holds at least 10% more energy than the amount required for excitation of said rotor.

10. The static excitation system of claim 1, wherein said energy storage device holds over 2 MJ.

11. A static excitation system for a superconducting rotor comprising:
    a brushless exciter system;
    a power conditioning device; and
    an energy storage device;
    wherein said energy storage device is linked to said power conditioning device, and wherein said power conditioning device is connected to said brushless exciter system;
    wherein said power conditioning device provides power from said energy storage device to said superconducting rotor when required, and when power to said superconducting rotor is not required, said power conditioning device takes excess power from said superconducting rotor and stores it in said energy storage device;
    wherein said static excitation system is independent from an external power grid.

12. The static excitation system of claim 11, wherein said superconducting rotor is part of a utility-industrial synchronous generator of at least 25 MVA.

13. The static excitation system of claim 11, wherein said energy storage device is at least one of a flywheel, capacitor and a bank of batteries.

14. The static excitation system of claim 11, wherein the energy storage device holds at least 10% more energy than the amount required for excitation of said rotor.

15. The static excitation system of claim 11, wherein said energy storage device holds over 1 kJ.

16. A method for supplying a superconducting rotor with static excitation comprising:
    obtaining a generator disposed within windings, said generator also having a shaft and a set of slip rings on said shaft;
    placing brushes in contact with said set of slip rings;
    connecting said brushes to a power conditioning device;
    linking said power conditioning device to an energy storage device;
    wherein said power conditioning device provides power from said energy storage device to said superconducting rotor when required, and when power to said superconducting rotor is not required, said power conditioning device takes excess power from said superconducting rotor and stores it in said energy storage device.

17. The method of claim 16, wherein a trickle charger occasionally supplements power to said energy storage device.

18. The method of claim 16, wherein said power conditioning device is independent from an external power grid.

* * * * *